United States Patent
Choi et al.

(10) Patent No.: US 9,525,962 B2
(45) Date of Patent: Dec. 20, 2016

(54) HEAD UNIT OF VEHICLE FOR SUPPORTING BLUETOOTH CONNECTION AND CONTROL METHOD THEREOF

(71) Applicant: HYUNDAI MOTOR COMPANY, Seoul (KR)

(72) Inventors: Seo Hwan Choi, Seoul (KR); Seong Soo Yae, Osan-si (KR); Woo Young Kwak, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/919,602

(22) Filed: Oct. 21, 2015

(65) Prior Publication Data

US 2016/0157049 A1 Jun. 2, 2016

(30) Foreign Application Priority Data

Nov. 12, 2014 (KR) .................. 10-2014-0157380

(51) Int. Cl.
| | | |
|---|---|---|
| *H04B 7/00* | (2006.01) | |
| *H04W 4/00* | (2009.01) | |
| *H04W 12/04* | (2009.01) | |
| *H04L 29/06* | (2006.01) | |
| *H04B 1/00* | (2006.01) | |
| *H04W 84/18* | (2009.01) | |

(52) U.S. Cl.
CPC ............ *H04W 4/008* (2013.01); *H04L 63/083* (2013.01); *H04W 12/04* (2013.01); *H04W 84/18* (2013.01)

(58) Field of Classification Search
CPC ....... H04W 12/06; H04W 12/12; H04W 84/18

USPC ......................................... 455/41.2, 410–411
See application file for complete search history.

(56) References Cited

U.S. PATENT DOCUMENTS

| | | | |
|---|---|---|---|
| 2007/0081506 A1 | 4/2007 | Yamada | |
| 2011/0307945 A1 | 12/2011 | Huang | |
| 2011/0320535 A1* | 12/2011 | Donaldson | H04W 4/00 709/204 |

FOREIGN PATENT DOCUMENTS

| | | |
|---|---|---|
| JP | 10-243053 A | 9/1998 |
| JP | 2004-180244 A | 6/2004 |
| KR | 10-2007-0098127 A | 10/2007 |
| KR | 10-2008-0021880 A | 3/2008 |
| KR | 10-2014-0045125 A | 4/2014 |
| WO | 2013-006377 A1 | 1/2013 |

OTHER PUBLICATIONS

Korean Office Action dated Aug. 27, 2015 issued in corresponding Korean Patent Application No. 10-2014-0157380.
Korean Notice of Allowance dated Nov. 4, 2015, issued in corresponding Korean Patent Application No. 10-2014-0157380.

* cited by examiner

*Primary Examiner* — Lee Nguyen
(74) *Attorney, Agent, or Firm* — McDermott Will & Emery LLP (57) ABSTRACT

A method for performing connection through Bluetooth by a head unit of a vehicle with a mobile device which is paired with the head unit includes transmitting, by a controller, a first message for checking a link-key to the mobile device. The controller transmits, upon receiving a second message indicating that connection is refused from the mobile device, a third message for starting a new pairing procedure to the mobile device.

16 Claims, 6 Drawing Sheets

HEAD UNIT OF VEHICLE FOR SUPPORTING BLUETOOTH CONNECTION AND CONTROL METHOD THEREOF

CROSS-REFERENCE TO RELATED ART

This application claims the benefit of Korean Patent Application No. 10-2014-0157380, filed on Nov. 12, 2014, which is hereby incorporated by reference as if fully set forth herein.

TECHNICAL FIELD

The present disclosure relates to a method for performing Bluetooth connection with a mobile device from a vehicle, and more particularly, to a vehicle capable of efficiently performing connection with a mobile device when the vehicle and the mobile device are paired in which connection information thereof remains only in the vehicle or the mobile device, and a control method thereof.

BACKGROUND

Currently, the use of a Bluetooth function is high due to rapid spread of a smartphone and the increased use of Bluetooth. The Bluetooth function can be used inside a vehicle because to make a call or listen music while driving the vehicle.

However, connection between the vehicle and the smartphone is not automatically established for the next use even though the connection was made in the past because connection information of the smartphone registered in a head unit of the vehicle providing a Bluetooth function is deleted, or connection information with the vehicle is deleted from the smartphone. For example, when some people (e.g., family members) share a vehicle and one of them deletes information about a registered device by mistake, or when information about a head unit is deleted from a Bluetooth list of the smartphone due to a malfunction caused during the operating system of the smartphone is frequently upgraded. Particularly, since a pairing procedure may be complicated, a user who is not familiar with the Bluetooth function, may not establish Bluetooth connection due to deletion of a connection list.

SUMMARY

The present disclosure is directed to a vehicle supporting efficient Bluetooth connection and a control method thereof which substantially obviate one or more problems due to limitations and disadvantages of the related art.

An aspect of the present inventive concept provides a vehicle capable of reducing dissatisfaction with and increasing usability of vehicle Bluetooth by easily establishing connection between a vehicle and a mobile device through simple user manipulation even when connection information is deleted from a connection list of the vehicle or the mobile device, and a control method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an exemplary embodiment of the present inventive concept, a method for performing connection through Bluetooth by a head unit of a vehicle with a mobile device which is paired with the head unit includes transmitting a first message for checking a link-key to the mobile device by a controller. The controller transmits, upon receiving a second message indicating that connection is refused from the mobile device, a third message for starting a new pairing procedure to the mobile device.

According to another exemplary embodiment of the present inventive concept, a head unit of a vehicle for performing connection through Bluetooth with a mobile device which is paired with the head unit includes a memory for storing a link-key for the mobile device. A Bluetooth module exchanges data in a Bluetooth manner. A controller is configured to control the Bluetooth module to transmit a first message for checking the link-key to the mobile device. The controller, upon receiving a second message indicating that connection is refused from the mobile device, transmits a third message for starting a new pairing procedure to the mobile device.

According to another exemplary embodiment of the present inventive concept, a method for performing connection through Bluetooth by a head unit of a vehicle with a mobile device which is paired with the head unit includes receiving a first message for checking a link-key from the mobile device by a controller. The controller transmits a second message indicating that connection is refused to the mobile device if the link-key is missing. The controller determines whether the mobile device has a connection history using a device address of the mobile device. The controller then transmits a third message for starting a new pairing procedure to the mobile device upon determining that the mobile device has the connection history.

According to another exemplary embodiment of the present inventive concept, a head unit of a vehicle for performing connection through Bluetooth with a mobile device which is paired with the head unit includes a memory for storing a device address of at least one connected external device. A Bluetooth module is configured to exchange data in a Bluetooth manner. A controller is configured to control the Bluetooth module to receive a first message for checking a link-key from the mobile device to transmit a second message indicating that connection is refused to the mobile device if the link-key is missing. The controller transmits a third message for starting a new pairing procedure to the mobile device if a device address of the mobile device is stored in the mobile device.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Reference will now be made in detail to exemplary embodiments of the present inventive concept, examples of which are illustrated in the accompanying drawings. Like reference numerals in the drawings denote like elements and repeated descriptions thereof will be omitted. The suffixes "module", "- - - er/or" and "unit" of elements herein are used for convenience of description and thus can be used interchangeably and do not have any distinguishable meanings or functions.

In the following description of the present disclosure, a detailed description of known functions and configurations incorporated herein will be omitted when it may make the subject matter of the present disclosure unclear. It should be understood that there is no intent to limit exemplary embodiments of the invention to the particular forms disclosed, rather, exemplary embodiments of the invention are to cover all modifications, equivalents, and alternatives falling within the spirit and scope of the invention.

The present disclosure is aimed to reduce dissatisfaction with and to increase usability of vehicle Bluetooth by easily establishing connection between a vehicle and a mobile device through simple user manipulation even when a connection list is deleted from the vehicle or the mobile device. Before describing embodiments of the present inventive concept for the above purpose, a description is first given of the concept of a link-key which is deleted together with the connection list.

Bluetooth communication is based on agreements between two devices. A link-key generated in a pairing step is shared by the two devices, access to each other is allowed through an authentication procedure between the two devices based on the link-key, and then connection is established based on reliability therebetween. That is, the link-key generated in the pairing step serves as a secret key for interconnecting the two devices after pairing. If the link-key, which is a secret key predefined between the two devices, is lost from one device (for example, due to deletion of the connection list), the connection between the two devices loses reliability and reconnection can only be successfully established by generating a link-key again through pairing.

To solve this inconvenience, the present disclosure proposes a method for successfully establishing reconnection without through pairing even when a link-key is deleted from a head unit or a device.

In general, two devices have the same link-key before the link-key is deleted if one device is paired with another device, and the link-key is checked using a specific message if the device having the link-key attempts reconnection with another device after connection is released. In this case, the specific message may be different from a message (e.g., (link manager protocol (LMP)_In_rand_req) for generating the link-key for initial pairing, and an example thereof may be an LMP_au_rand message. Here, LMP refers to a link manager protocol which is associated with link establishment between Bluetooth devices. The LMP_au_rand message includes a random number encrypted into a link-key. Accordingly, if the link-key is deleted from a receiver side, the receiver side cannot generate the same number using the link-key, and thus transmits an LMP_not_accepted message to a transmitter side (i.e., a device having the link-key and attempting connection) to signal that connection is refused. In addition, the corresponding device transmits an LMP_detach message to the transmitter side and then releases connection.

Accordingly, the connection attempt terminates if the link-key is lost from even one device in a legacy case. To solve this problem, the present disclosure transmits a message for checking a link-key of an opposite device by a device having the link-key, and to immediately start new pairing if a message indicating that connection is refused is received in response to the transmitted message.

When a head unit of a vehicle and a mobile device of a driver are paired with each other through Bluetooth, the head unit may have connection information of the mobile device but information about the head unit may be deleted from the mobile device, and thus only the head unit has a link-key, or the mobile device may have the link-key.

The case in which only the head unit has a link-key is now described with reference to FIGS. 1 to 3.

Figure 1:
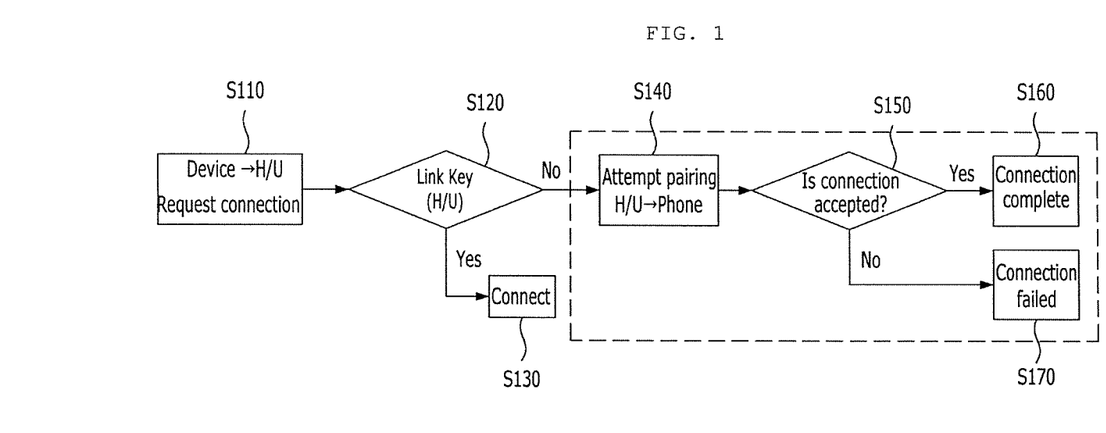
FIG. 1 illustrates an example of a connection procedure between a head unit of a vehicle and a mobile device according to an embodiment of the present inventive concept.

FIG. 1 illustrates an example of a connection procedure between a head unit of a vehicle and a mobile device according to an embodiment of the present disclosure.

Referring to FIG. 1, if information about the mobile device remaining on a connection list of the head unit is found, the head unit requests connection (e.g., transmits LMP_au_rand) using a link-key for the corresponding device (S110).

If the mobile device also has a link-key for the head unit (S120), connection may be immediately established (S130). If not, connection is refused (e.g., an LMP_not_accepted message is received).

In this case, the head unit automatically attempts connection to the mobile device using another message (S140). Here, the other message is a message for starting new pairing, and may be a capability request (LMP_IO Capab_req) message.

As a series of messages are exchanged subsequently to the above message, the head unit generates and transmits a passkey to the mobile device. If the mobile device accepts connection using the same (S150), new pairing may be completed and thus the two devices may be connected to each other (S160). If the mobile device does not accept connection, connection fails (S170).

Figure 2:
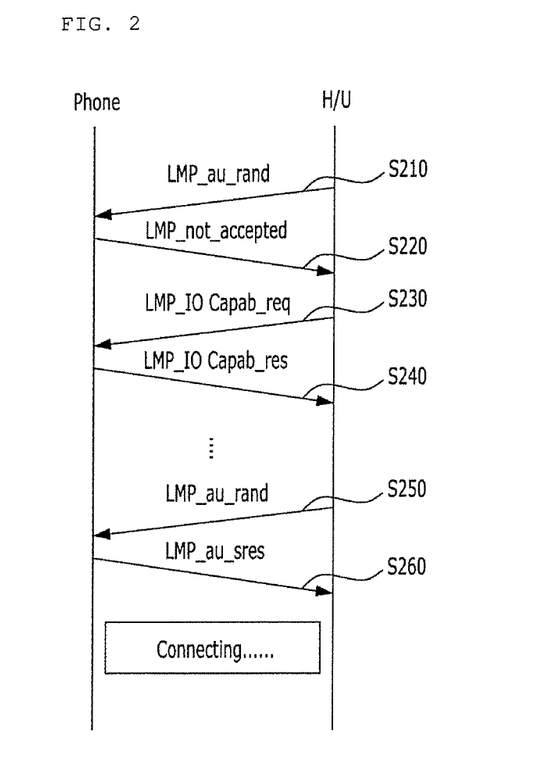
FIG. 2 illustrates an example of a message exchange procedure for connection between the head unit of the vehicle and the mobile device according to an embodiment of the present inventive concept.

The above procedure is now described in relation to message exchange with reference to FIG. 2.

FIG. 2 illustrates an example of a message exchange procedure for connection between the head unit of the vehicle and the mobile device according to an embodiment of the present inventive concept.

Referring to FIG. 2, initially, an LMP_au_rand message for checking the link-key is transmitted from the head unit to the mobile device (S210). Since the link-key is deleted from the mobile device, an LMP_not_accepted message for refusing connection is transmitted to the head unit (S220).

Even when the mobile device terminates connection by transmitting an LMP_detach message (not shown), the head unit may determine that the link-key is deleted from the mobile device and transmit an LMP_IO Capab_req message for starting new pairing to the mobile device (S230). The mobile device may transmit an LMP_IO Capab_res message to the head unit in response thereto (S240), and then a series of messages for completing new pairing are exchanged. The messages exchanged in this case follow a procedure defined by the general Bluetooth standard (i.e., IEEE 802.15.1 standard), and thus detailed descriptions thereof are omitted here for brevity.

After generation of a new link-key is completed, the head unit transmits an LMP_au_rand message for checking the new link-key to the mobile device (S250). The mobile device successfully generates the same number using the new link-key, and transmits an LMP_au_sres message to the head unit in response thereto (S260). As such, the connection procedure is completed, and the head unit and the mobile device may normally exchange data.

Figure 3:
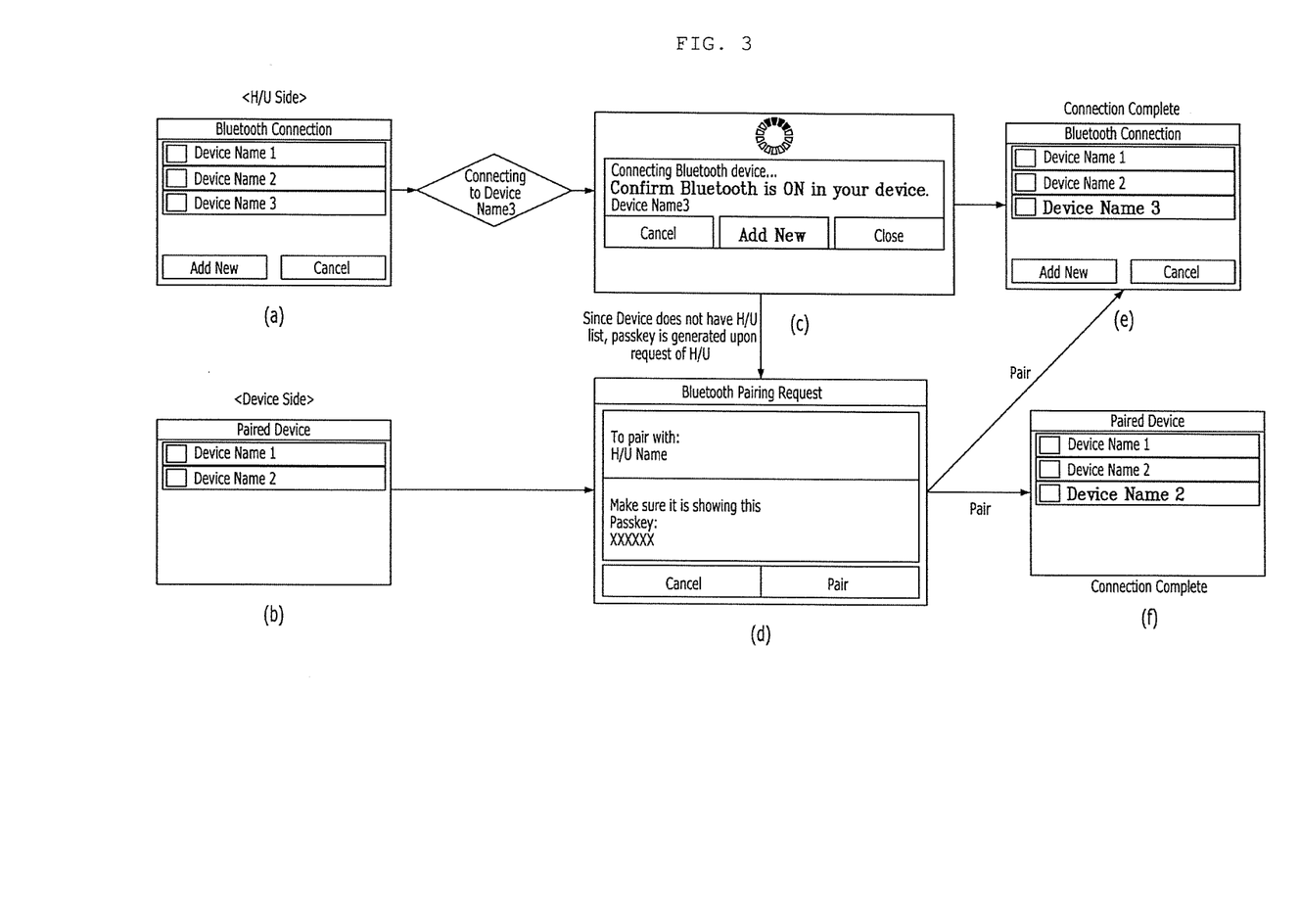
FIG. 3 illustrates an example of information displayed in the connection procedure between the head unit and the mobile device according to an embodiment of the present inventive concept.

The above procedure is now described in relation to information displayed on each device with reference to FIG. 3.

FIG. 3 illustrates an example of information displayed in the connection procedure between the head unit and the mobile device according to an embodiment of the present disclosure.

FIG. 3 assumes that the name of the mobile device on a device connection list of an opposite device is "Device Name 3", and the name of the head unit is "H/U Name".

Referring to (a) of FIG. 3, a Bluetooth device connection list is displayed on a display of the head unit. Information about the mobile device remains on the device connection list of the head unit, and thus, the head unit has a link-key for the mobile device. However, as illustrated in (b) of FIG. 3, information about the head unit is deleted from a Bluetooth device connection list of the mobile device, and thus, a link-key for the head unit is lost. In this case, if the head unit attempts connection, the mobile device refuses connection. As such, the head unit starts a new pairing procedure and thus a screen image showing that the connection attempt is in progress is displayed as illustrated in (c) of FIG. 3. As the head unit transmits a new passkey as illustrated in (d) of FIG. 3, a menu for receiving a user command indicating whether to accept connection is displayed on the mobile device.

After connection is completed, the name of the opposite device is displayed on the connection device list of each device as illustrated in (e) and (f) of FIG. 3.

The case in which only the mobile device has a link-key is now described with reference to FIGS. 4 to 6.

Even when only the mobile device has the link-key, the head unit of the vehicle stores Bluetooth device (BD) addresses of a certain number of (e.g., 5) opposite devices having been paired with the head unit. Accordingly, in the current embodiment, even when the mobile device having the link-key requests connection to the head unit but the link-key is lost from the head unit, the head unit may automatically start a new pairing procedure if the BD address of the opposite mobile device still remains in the head unit.

Figure 4:
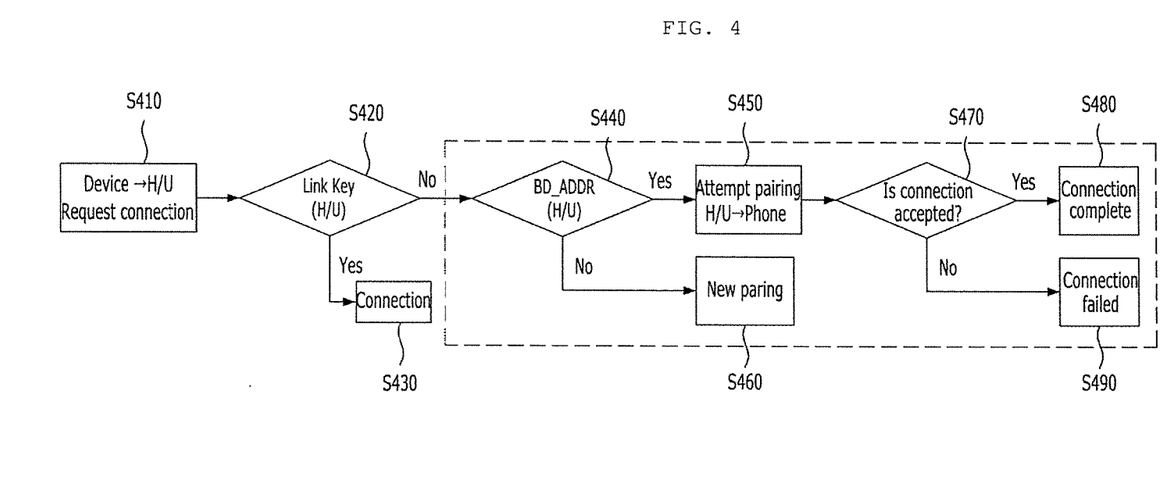
FIG. 4 illustrates another example of a connection procedure between a head unit of a vehicle and a mobile device according to an embodiment of the present inventive concept.

FIG. 4 illustrates another example of a connection procedure between a head unit of a vehicle and a mobile device according to an embodiment of the present inventive concept.

Referring to FIG. 4, if information about the head unit remaining on a connection list of the mobile device is found, the mobile device requests connection (e.g., transmits LMP_au_rand) using a link-key for the corresponding device (S410).

If the head unit also has a link-key for the mobile device (S420), connection may be immediately established (S430). If not, connection is refused (e.g., an LMP_not_accepted message is received).

In this case, the head unit determines whether the mobile device (i.e., the device which has requested connection) has a connection history by checking a BD address of the mobile device (S440). If the mobile device does not have a connection history, the connection attempt is terminated and then new pairing may be performed in the same manner as initial connection based on a pairing command of a user (S450). Otherwise, if the mobile device has a connection history, the head unit automatically attempts connection to the mobile device using another message (S460). Here, the other message is a message for starting new pairing, and may be a capability request (LMP_IO Capab_req) message.

As a series of messages are exchanged subsequently to the above message, the head unit generates and transmits a passkey to the mobile device. If the mobile device accepts connection using the same (S470), new pairing may be completed and thus the two devices may be connected to each other (S480). If the mobile device does not accept connection, the connection is failed (S490).

Figure 5:
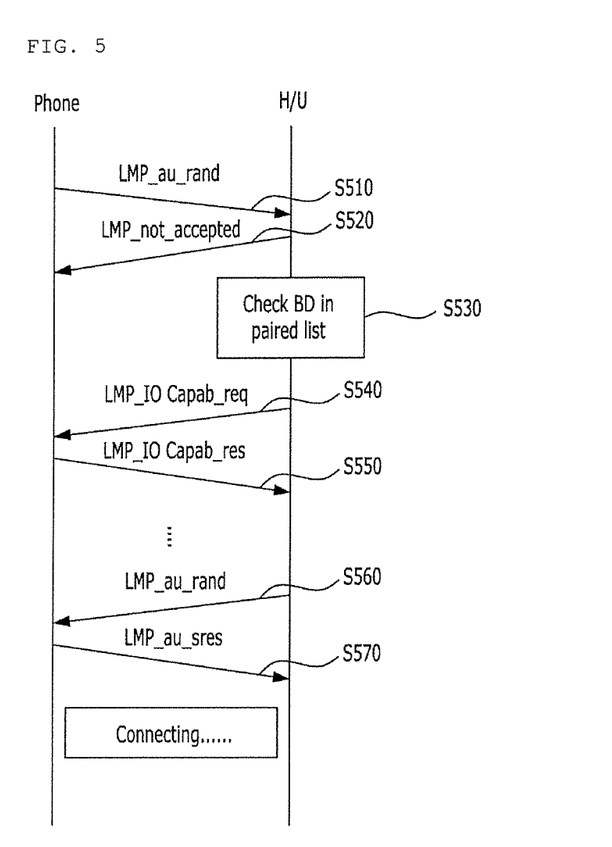
FIG. 5 illustrates another example of a message exchange procedure for connection between the head unit of the vehicle and the mobile device according to an embodiment of the present inventive concept.

The above procedure is now described in relation to message exchange with reference to FIG. 5.

FIG. 5 illustrates another example of a message exchange procedure for connection between the head unit of the vehicle and the mobile device according to an embodiment of the present inventive concept.

Referring to FIG. 5, initially, an LMP_ au_rand message for checking the link-key is transmitted from the mobile device to the head unit (S510). Since the link-key is deleted from the head unit, an LMP_not_accepted message for refusing connection is transmitted to the mobile device (S520).

Even when or irrespective of whether the mobile device determines that the link-key is deleted from the head unit and terminates connection by transmitting an LMP_detach message (not shown), the head unit determines whether the mobile device has a connection history using the BD address of the mobile device (S530). If the mobile device has a connection history, the head unit may transmit an LMP_IO Capab_req message for starting new pairing to the mobile device (S540). The mobile device may transmit an LMP_IO Capab_res message to the head unit in response thereto (S550), and then a series of messages for completing new pairing are exchanged. The messages exchanged in this case follow a procedure defined by the general Bluetooth standard (i.e., IEEE 802.15.1 standard), and thus, detailed descriptions thereof are omitted here for brevity.

After generation of a new link-key is completed, the head unit transmits an LMP_au_rand message for checking the new link-key to the mobile device (S560). The mobile device successfully generates the same number using the new link-key, and transmits an LMP_au_sres message to the head unit in response thereto (S570). As such, the connection procedure is completed, and the head unit and the mobile device may exchange data normally.

Figure 6:
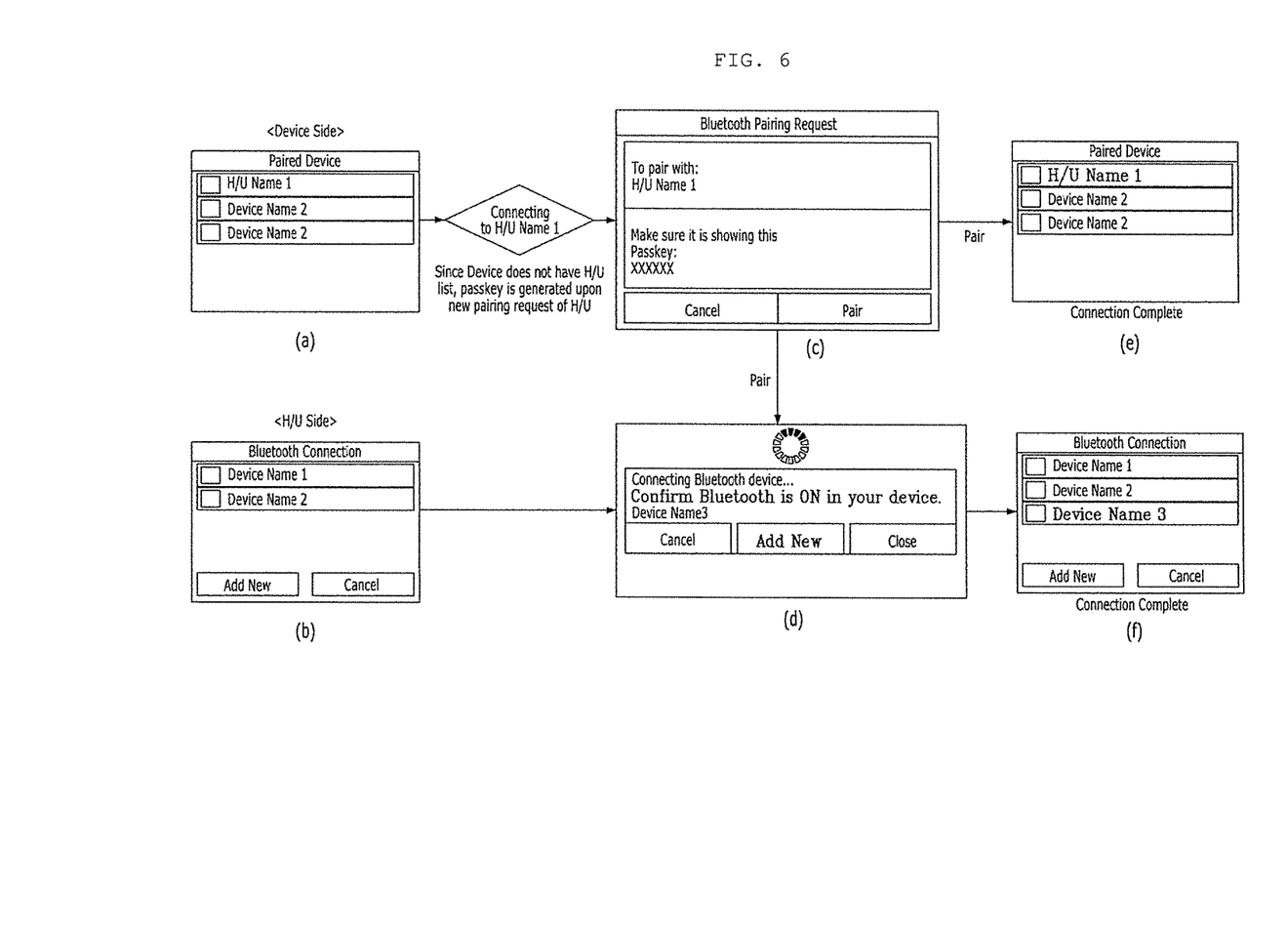
FIG. 6 illustrates another example of information displayed in the connection procedure between the head unit and the mobile device according to an embodiment of the present inventive concept.

The above procedure is now described in relation to information displayed on each device with reference to FIG. 6.

FIG. 6 illustrates another example of information displayed in the connection procedure between the head unit and the mobile device according to an embodiment of the present inventive concept.

FIG. 6 assumes that the name of the mobile device on a device connection list of an opposite device is "Device Name 3", and the name of the head unit is "H/U Name".

Referring to (a) of FIG. 6, a Bluetooth device connection list is displayed on a display of the mobile device. Information about the head unit remains on the device connection list of the mobile device, and thus the mobile device has a link-key for the head unit. However, as illustrated in (b) of FIG. 6, information about the mobile device is deleted from a Bluetooth device connection list of the head unit, and thus, a link-key for the mobile device is lost. In this case, if the mobile device attempts connection, the head unit refuses connection. However, if the head unit has a BD address of the mobile device and thus determines that the mobile device has a connection history, the head unit starts a new pairing procedure and thus a screen image showing that the connection attempt is in progress is displayed as illustrated in (d) of FIG. 6. As the head unit transmits a new passkey as illustrated in (c) of FIG. 6, a menu for receiving a user command indicating whether to accept connection is displayed on the mobile device.

After the connection is completed, the name of the opposite device is displayed on the connection device list of each device as illustrated in (e) and (f) of FIG. 6.

A description is now given of device configurations for implementing the above-described embodiments.

A mobile device according to the present disclosure may be applied to any device providing a Bluetooth function. For example, the mobile device according to the present disclosure may be a smartphone, laptop computer, portable multimedia player (PMP), smart tablet, or handsfree headset. Furthermore, the mobile device may include a Bluetooth module for exchanging data in a Bluetooth manner, a memory for storing a device connection list and link-keys, and a controller for providing overall control to the Bluetooth module and the memory. Particularly, the controller may control all procedures for determining connection to another device based on whether the other device has a link-key, generating the above-described messages, and transmitting and receiving the same through the Bluetooth module to establish connection using the link-key or to perform new pairing.

In addition, a head unit according to the present disclosure may include a Bluetooth module, a memory, and a controller similarly to the mobile device, except for elements related to a vehicle.

The above-described device configurations are merely exemplary. A plurality of controllers may be used to individually correspond to a plurality of functions, or a plurality of functions may be controlled by one controller, and a display, an input unit for receiving a user command, a sound output unit, etc. may be further included as necessary.

According to at least one embodiment of the present disclosure, the following effects are achieved.

Since connection may be successfully performed without performing a pairing procedure again even when a link-key is deleted from a vehicle or a mobile device, although the link-key is deleted due to a user mistake or an error, the user may use Bluetooth without inconvenience through a recovery logic of the vehicle.

It will be appreciated by persons skilled in the art that the effects that could be achieved through the present disclosure are not limited to what has been particularly described hereinabove and other advantages of the present disclosure will be more clearly understood from the detailed description.

The present disclosure can also be embodied as computer-readable code on a computer-readable recording medium. The computer-readable recording medium is any data storage device that can store data which can be thereafter read by a computer system. Examples of the computer-readable recording medium include hard disk drives (HDDs), solid state disks (SSDs), silicon disk drives (SDDs), read-only memory (ROM), random-access memory (RAM), CD-ROMs, magnetic tapes, floppy disks, and optical data storage devices.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A method for performing connection through Bluetooth by a head unit of a vehicle with a mobile device which is paired with the head unit, the method comprising:
   transmitting, by a controller, a first message for checking a link-key to the mobile device; and
   transmitting, by the controller, upon receiving a second message indicating that connection is refused from the mobile device, a third message for starting a new pairing procedure to the mobile device,
   wherein the step of transmitting the third message is performed regardless of whether a fourth message indicating that the connection is released is received from the mobile device, and
   wherein the third message is a message generated by the head unit based on a connection history in response to the deletion of the link-key when the link-key is deleted from the mobile device and the fourth message is a message for terminating connection by the mobile device in response to the deletion of the link-key.

2. The method according to claim 1, wherein the step of transmitting the first message is performed when the mobile device is present on a device connection list of the head unit.

3. The method according to claim 1, wherein the first message is a link manager protocol (LMP)_au_rand message,
   wherein the second message is an LMP_not_accepted message, and
   wherein the third message is an LMP_IO capab_req message.

4. The method according to claim 1, further comprising:
   transmitting a passkey to the mobile device; and
   completing the new pairing procedure upon receiving an acceptance response from the mobile device to the transmitted passkey.

5. A head unit of a vehicle for performing connection through Bluetooth with a mobile device which is paired with the head unit, the head unit comprising:
   a memory for storing a link-key for the mobile device;
   a Bluetooth module configured to exchange data in a Bluetooth manner; and
   a controller configured to control the Bluetooth module:
      to transmit a first message for checking the link-key to the mobile device; and to transmit, upon receiving a second message indicating that connection is refused from the mobile device, a third message for starting a new pairing procedure to the mobile device, wherein the controller transmits the third message regardless of whether a fourth message indicating that the connection is released is received from the mobile device, and wherein the third message is a message generated by the head unit based on a connection history in response to the deletion of the link-key when the link-key is deleted from the mobile device and the fourth message is a message for terminating connection by the mobile device in response to the deletion of the link-key.

6. The head unit according to claim 5, wherein the controller transmits the first message when the mobile device is present on a device connection list of the memory.

7. The head unit according to claim 5, wherein the first message is an LMP_au_rand message, wherein the second message is an LMP_not_accepted message, and wherein the third message is an LMP_IO capab_req message.

8. The head unit according to claim 5, wherein the controller transmits a passkey to the mobile device and completes the new pairing procedure upon receiving an acceptance response to the transmitted passkey from the mobile device.

9. A method for performing connection through Bluetooth by a head unit of a vehicle with a mobile device which is paired with the head unit, the method comprising:

receiving, by a controller, a first message for checking a link-key from the mobile device;

transmitting, by the controller, a second message indicating that connection is refused to the mobile device if the link-key is missing;

determining, by the controller, whether the mobile device has a connection history using a device address of the mobile device; and transmitting, by the controller, a third message for starting a new pairing procedure to the mobile device upon determining that the mobile device has the connection history, wherein the transmitting of the third message is performed regardless of whether a fourth message indicating that connection is released is transmitted from the mobile device, and wherein the third message is a message generated by the head unit based on the connection history in response to the deletion of the link-key when the link-key is deleted from the head unit and the fourth message is a message for terminating connection by the mobile device in response to the deletion of the link-key.

10. The method according to claim 9, wherein the device address of the mobile device comprises a Bluetooth device (BD) address.

11. The method according to claim 9, wherein the first message is an LMP_au_rand message, wherein the second message is an LMP_not_accepted message, and wherein the third message is an LMP_IO capab_req message.

12. The method according to claim 9, further comprising:

transmitting a passkey to the mobile device; and completing the new pairing procedure upon receiving an acceptance response to the transmitted passkey from the mobile device.

13. A head unit of a vehicle for performing connection through Bluetooth with a mobile device which is paired with the head unit, the head unit comprising:

a memory for storing a device address of the mobile device;

a Bluetooth module configured to exchange data in a Bluetooth manner; and a controller configured to control the Bluetooth module: to receive a first message for checking a link-key from the mobile device; to transmit a second message indicating that connection is refused to the mobile device if the link-key is missing; and to transmit a third message for starting a new pairing procedure to the mobile device if a device address of the mobile device is stored in the mobile device, wherein the controller transmits the third message regardless of whether a fourth message indicating that connection is released is transmitted from the mobile device, and wherein the third message is a message generated by the head unit based on the connection history in response to the deletion of the link-key when the link-key is deleted from the head unit and the fourth message is a message for terminating connection by the mobile device in response to the deletion of the link-key.

14. The head unit according to claim 13, wherein the device address of the mobile device comprises a Bluetooth device (BD) address.

15. The head unit according to claim 13, wherein the first message is an LMP_au_rand message, wherein the second message is an LMP_not_accepted message, and wherein the third message is an LMP_IO capab_req message.

16. The head unit according to claim 13, wherein the controller transmits a passkey to the mobile device, and completes the new pairing procedure upon receiving an acceptance response to the transmitted passkey from the mobile device.

* * * * *